United States Patent [19]
Alton

[11] Patent Number: 6,034,362
[45] Date of Patent: Mar. 7, 2000

[54] CIRCULARLY POLARIZED MICROWAVE ENERGY FEED

[75] Inventor: William J. Alton, Groton, Mass.

[73] Assignee: Ferrite Components, Inc., Hudson, N.H.

[21] Appl. No.: 09/113,479

[22] Filed: Jul. 10, 1998

[51] Int. Cl.[7] .................................................. H05B 6/74
[52] U.S. Cl. .......................... 219/746; 219/747; 219/750; 219/745
[58] Field of Search .................... 219/746, 747, 219/750, 745, 695, 696

[56] References Cited

U.S. PATENT DOCUMENTS

| | | | |
|---|---|---|---|
| 4,125,838 | 11/1978 | Kaloi | 343/700 |
| 4,301,347 | 11/1981 | Quine | 219/10.55 |
| 4,314,127 | 2/1982 | Weiss | 219/10.55 |
| 4,324,968 | 4/1982 | Smith | 219/10.55 |
| 4,336,434 | 6/1982 | Miller | 219/10.55 F |
| 4,342,896 | 8/1982 | Teich | 219/10.55 |
| 4,412,117 | 10/1983 | Dudley et al. | 219/10.55 |
| 4,414,453 | 11/1983 | Simpson | 219/10.55 |
| 4,421,968 | 12/1983 | Osepchuk | 219/10.55 F |
| 4,556,771 | 12/1985 | Thomas | 219/10.55 |
| 4,580,023 | 4/1986 | Simpson | 219/10.55 F |
| 4,596,915 | 6/1986 | Simpson | 219/10.55 |
| 4,684,776 | 8/1987 | Heard | 219/10.55 M |
| 5,216,327 | 6/1993 | Myers et al. | 315/39.53 |
| 5,216,430 | 6/1993 | Rahm et al. | 343/700 |
| 5,661,494 | 8/1997 | Bondyopadhyay | 343/700 |

*Primary Examiner*—Teresa Walberg
*Assistant Examiner*—Shawntina Fuqua
*Attorney, Agent, or Firm*—Hamilton, Brook, Smith & Reynolds, P.C.

[57] ABSTRACT

A feed that provides circularly polarized microwave energy such as for energizing a cavity in a microwave oven. The feed includes a transformer to match a linearly polarized rectangular waveguide to an exit waveguide which may be circular or square in cross section. The exit waveguide contains an asymmetrical element that provides symmetry about a plane only. The asymmetrical element therefore introduces a difference in microwave electrical phase of 90 degrees for polarizations which are respectively parallel to and perpendicular to the symmetry plane. The two components add to provide circularly polarized energy at constant magnitude but continually rotating phase. An extension may be used to modify the spread and matching of the energy from the exit waveguide into the enclosure.

20 Claims, 9 Drawing Sheets

ROUND GUIDE WITH ASYMMETRY 25
E2 IS IN SINGLE SYMMETRY PLANE

FIG. 9B

TRANSFORMER: 23
RECTANGULAR TO BOUND

FIG. 9A

RECTANGULAR WAVEGUIDE 14

CIRCULARLY POLARIZED MICROWAVE ENERGY FEED

BACKGROUND OF THE INVENTION

Microwave ovens, now a more or less permanent fixture in many home kitchens, also increasingly find use in high volume industrial applications. For example, the tempering of large quantities of frozen meat, fish, poultry and fruit is greatly enhanced with the use of microwave ovens. Not only do they provide for greater uniformity in processing, they also eliminate an otherwise several hour wait time to thaw a frozen product prior to its availability for use, while minimizing drip loss and improving sanitation.

It has been known for some time that microwave ovens preferably include some type of structure for promoting uniformity of microwave energy distribution within the cooking cavity. This is because in a typical box shaped microwave oven, the spatial distribution of the microwave energy tends to be non-uniform. As a result, hot spots and cold spots are produced at different locations. Cooking results are therefore unsatisfactory under such conditions because some portions of the food may be completely cooked while others are barely warmed. This problem becomes more severe with foods which do not readily conduct heat from the areas which are heated by microwave energy to those areas which are not. An example of a food falling within this class is cake. However, other foods frequently cooked in microwave ovens, such as meat, also produce unsatisfactory cooking results if the distribution of energy within the cavity is not uniform.

The conventionally accepted explanation for non-uniform cooking patterns is that electromagnetic standing wave patterns, known as modes, are set up within the cooking cavity. Within such a standing wave pattern, the intensities of the electric and magnetic fields vary greatly with position. The precise configuration of the standing wave or mode pattern is dependent upon at least the frequency of the microwave energy used to excite the cavity and upon the dimensions of the cavity itself.

There have been a great many approaches proposed for alleviating the problem of non-uniform energy distribution. A common approach, used in many domestic microwave ovens, is a device known as a mode stirrer. A mode stirrer typically resembles a fan having metal blades. The mode stirrer rotates continually to alter the mode pattern within the cooking cavity. The mode stirrer may be placed either within the cooking cavity itself (usually protected by a cover constructed of a material that is transparent to microwaves), or to conserve space within the cooking cavity, may be mounted within a recess formed in one of the walls adjacent the cavity. Another approach is to use a carousel tray within the oven cavity, which rotates the food itself.

Yet another approach to the problem of non-uniform energy distribution is to introduce a polarized energy beam into an oven cavity using a number of phased feed points, or to use an antenna including one or more planar conductive plates.

Unfortunately, while these approaches work somewhat for power levels typical of microwave ovens intended for use in domestic kitchens, they are not particularly adaptable for use in high volume industrial applications. It is not uncommon for an industrial microwave oven, for example, to be required to process several hundred kilograms of product in a several minute time span, producing radio frequency energy levels of 50 kilowatts (kW) or more. The known approaches have limitations in power handling due to the use of coaxial sections which intrinsically have less power capability than a waveguide. In addition, the rotating parts used to vary the energy polarization also have power handling and reliability limitations.

SUMMARY OF THE INVENTION

The present invention is a technique for coupling microwave energy to many modes of a microwave cavity by generating a circularly polarized microwave signal, whereby a polarization vector of the microwave energy continually rotates. The coupling device includes a transformer to match from an input waveguide polarization, such as provided by a rectangular waveguide, to a circular or square polarization waveguide section. The polarization waveguide section contains an asymmetrical insert element disposed within it such that in the region of the asymmetrical element, electromagnetic symmetry is about a symmetry plane only. The position and dimensions of the polarization insert are selected to introduce a difference in electrical phase of 90 degrees for polarizations which are parallel to and perpendicular to the symmetry plane.

By introducing two linearly polarized components which are 90 degrees out of phase with one another, the sum of their microwave energies produced at the output end of the polarizer is circularly polarized with constant amplitude, but with an angle of polarization that continuously rotates. Since the polarization vector continually rotates, microwave energy is coupled to many modes of the enclosure as a result.

The asymmetrical insert element may be shaped so that an impedance matching effect is achieved, thereby enabling a more efficient transmission match.

Optionally, an extension may be placed at the end of the polarizer and extend into the enclosure to encourage launching of the energy into the cavity.

The feed is of particular use in ovens which are adapted for both microwave and hot air or gas heating, since the feed is assembled from fixed, rigid, metal components and does not require mode stirrers or other rotating components.

The invention provides circularly polarized microwave energy which continuously varies to energize many modes of an oven cavity. The continuously varying polarization is achieved with no moving parts and with greatly increased power handling capability, since only waveguide type components are used with no need for mechanically rotating sections, patch antennas, or coaxial lines.

DETAILED DESCRIPTION OF THE INVENTION

Figure 1:
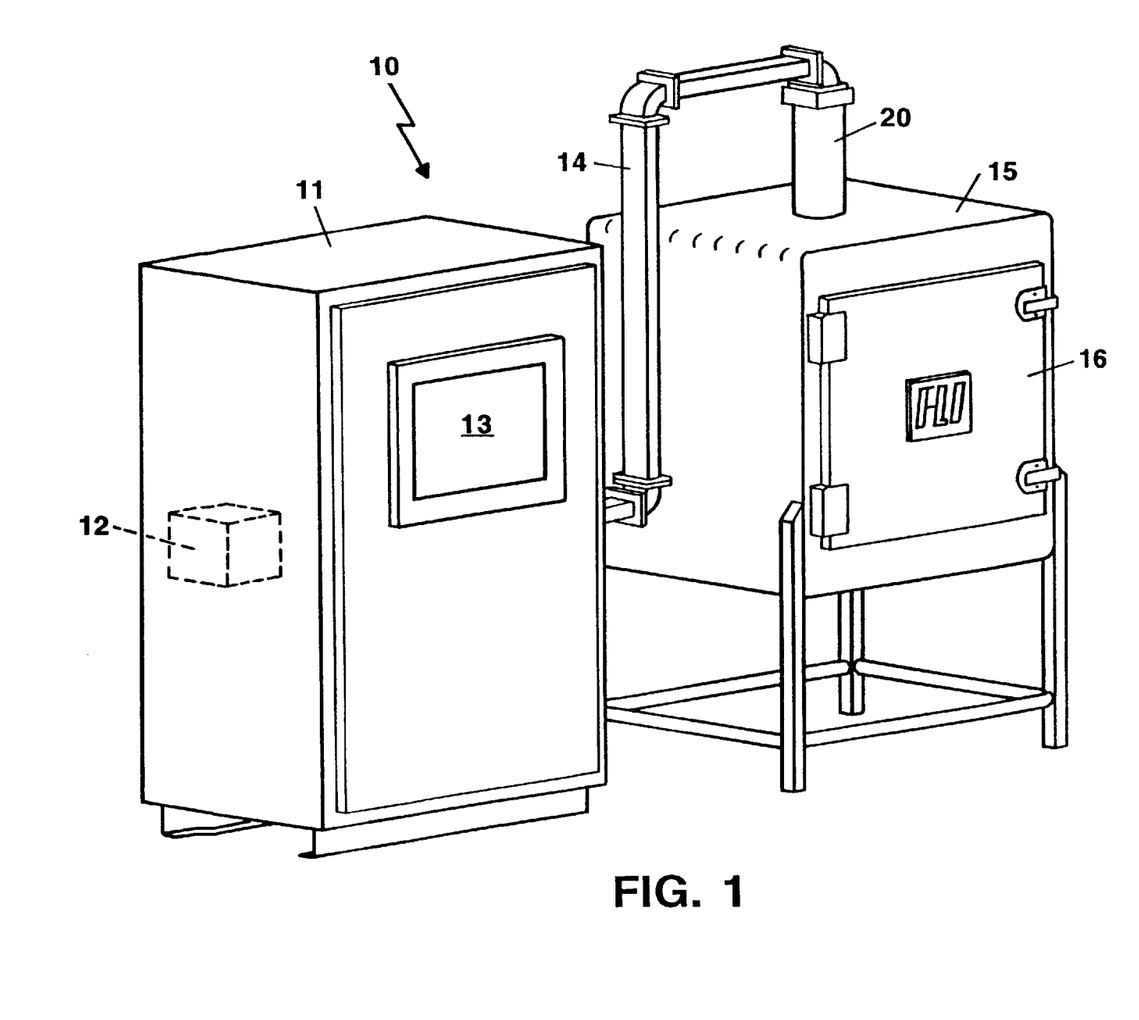
FIG. 1 is a perspective view of a batch type industrial grade microwave oven which makes use of a circularly polarized feed according to the invention.

Turning attention now to the drawings more particularly, FIG. 1 illustrates a microwave oven such as used in a batch processing industrial application, or batch oven 10, which makes use of a circularly polarized feed assembly according to the invention. The batch oven 10 includes a cabinet 11 which encloses a microwave energy source 12. A control panel 13 disposed on the outer surface of the cabinet 11 allows operator interface with control electronics. Waveguide 14 provides microwave energy from the energy source 12 to the interior of an oven cavity or enclosure 15. A door assembly 16 provides access to the interior enclosure 15. The present invention is related in particular to how the waveguide 14 couples microwave energy to the interior of the enclosure 15 through a polarizer assembly 20. It should be understood, however, that the enclosure 15 may also be a combination type oven or kiln also heatable by hot air, gas, or other convection heating techniques as well.

Figure 2A:
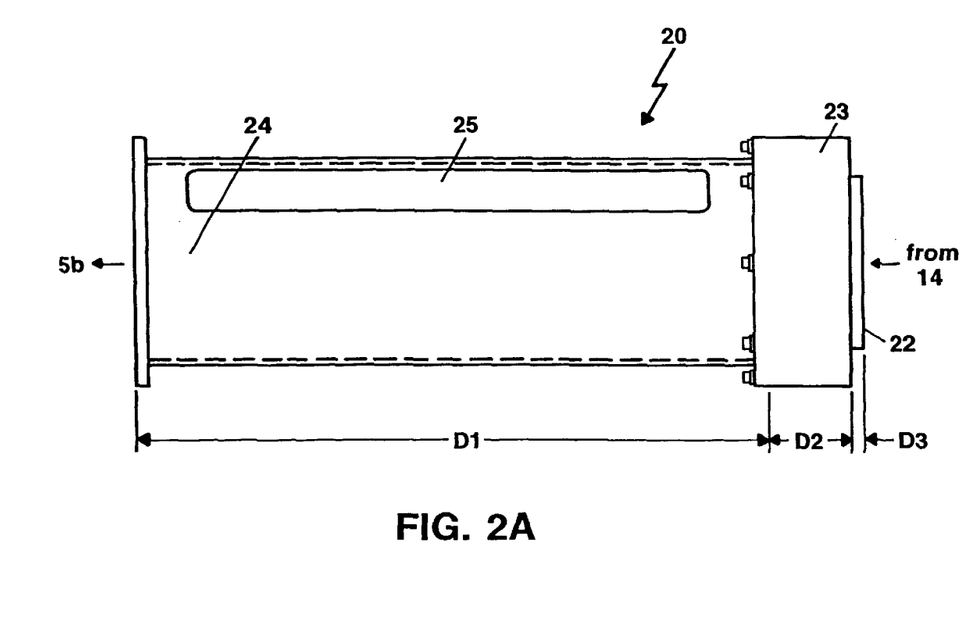
FIGS. 2A and 2B are side and end views of the circularly polarized feed using a cylindrical waveguide section.
Figure 2B:
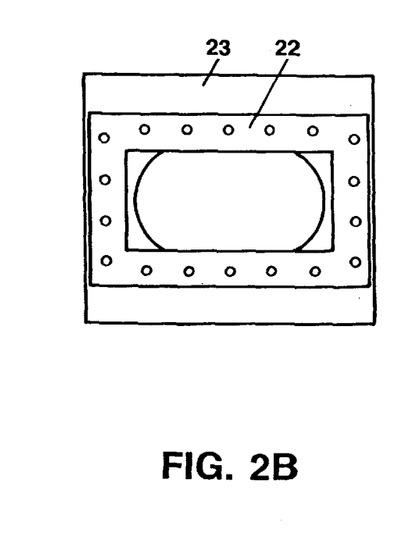

FIGS. 2A and 2B are, respectively, a side view and front end view of the polarizer assembly 20 according to the invention. The polarizer assembly 20 accepts energy from a rectangular waveguide 14, such as operating in the linearly polarized $TE_{11}$ mode, and couples such microwave energy to many modes of the enclosure 15. The generated circularly polarized microwave signal is one in which the polarization vector of the microwave energy continually rotates.

As seen in FIG. 2A, the polarizer assembly 20 consists of a flange 22, a rectangular-to-round transformer 23, a cylindrical section 24, and a quarter wave, asymmetrical insert element 25. The components of the polarizer assembly 20 are machined from a suitable material such as aluminum, with a chromate golden finish per, for example, standard MIL-C-5541.

FIG. 2B shows an end view of the polarizer assembly 20 taken from the input end which is coupled to the rectangular waveguide 14. This view shows the flange 22 in end view as well as a partial view of an interior portion of the transformer 23.

Figure 3A:
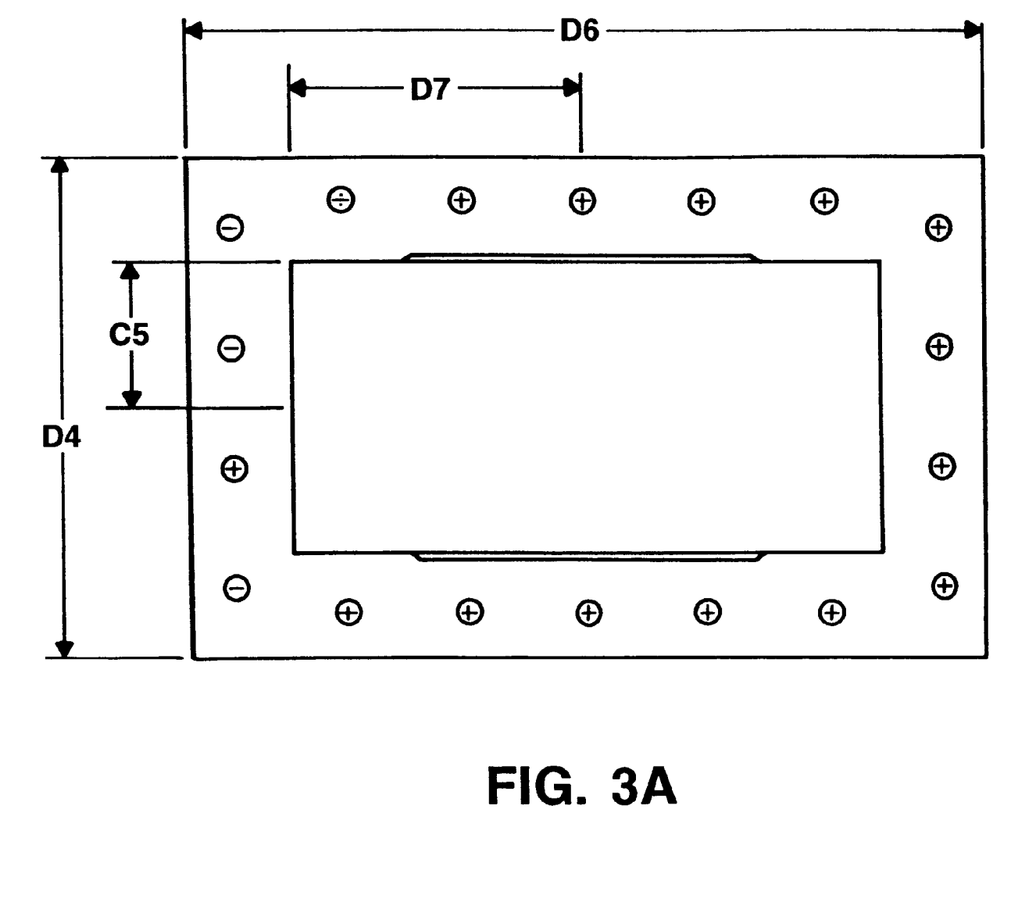
FIGS. 3A and 3B are front and cross-sectional views of a waveguide flange.
Figure 3B:
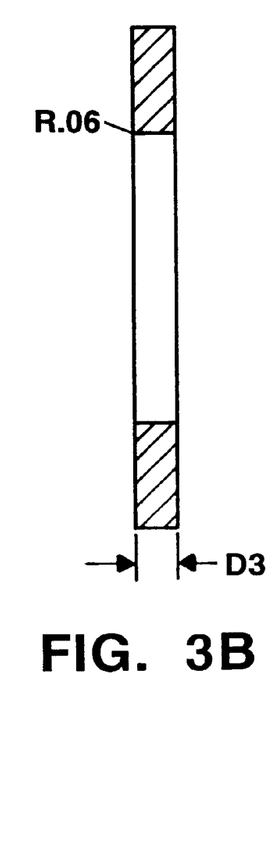

FIGS. 3A and 3B are a plan and cross-sectional view, respectively, of the flange 22. The flange 22 is generally rectangular in shape with a central cut out section 28.

Typical dimensions of the polarizer assembly 20 for operation at 915 MegaHertz (MHZ) are a cylindrical sectional length D1 of 30.00 inches (in), transformer length D2 of 4.070 in, and a flange thickness D3 of 0.625 in. The dimensions of the flange 22 are therefore typically a height D4 of 8.375 in, a half height of the opening D5 of 2.437 in, a width D6 overall of 13.25 in, and a opening half width D7 of 4.875 in.

Figure 4A:
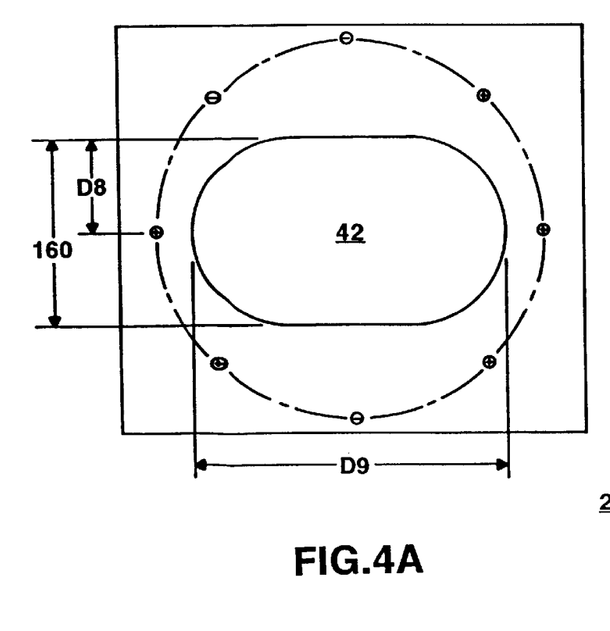
FIGS. 4A, 4B, and 4C are rear, cross-sectional, and front views of a transformer.
Figure 4B:
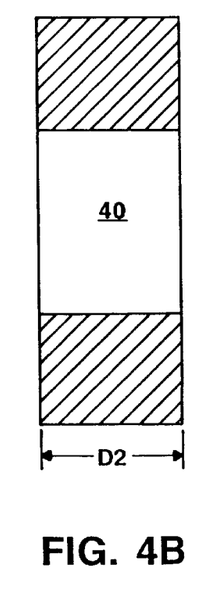
Figure 4C:
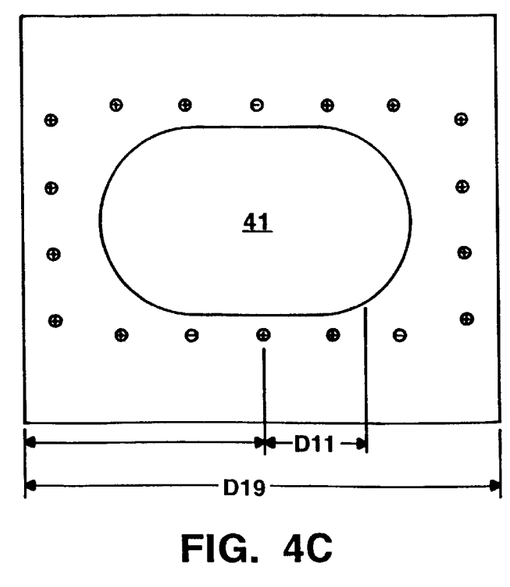

The rectangular-to-round transformer 23 is more particularly shown in the views of FIGS. 4A, 4B and 4C. The transformer 23 couples microwave energy from a rectangular waveguide 14 to a circular waveguide provided by the cylindrical section 24. FIG. 4A is a plan view of the end of the transformer 23 closest to the cylindrical section 24. FIG. 4B is a cross-sectional view of the transformer 23, and FIG. 4C is a plan view of the end of the transformer 23 closest to the flange 22.

The transformer 23 has an opening 40 formed therein to permit the passage of microwave energy. The shape of the opening 40 is selected to be a shape which is transitional between the rectangular interior section of the rectangular waveguide 14 and the circular interior dimension of the cylindrical section 24. The preferred shape is as shown is a quasi-elipsoid having a flat top and bottom, and rounded sides. The ends of the elipsoid may have a radius D8 of 2.730 in, and an overall width of D9 of 8.970 in. The opening 40 may be centered within a rectangular shaped block of aluminum having an overall width D10 of 13.50 in, with the center radius of the outer edge disposed a distance D11 of 2.984 in from the center of the block. As shown, the leading edges of the input side of the transformer 23 may be slightly rounded to encourage energy coupling and enhance power handling.

Figure 5A:
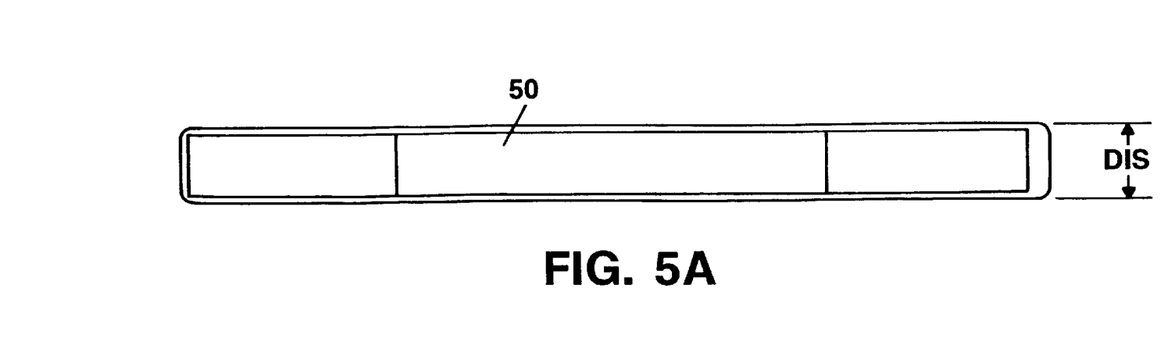
FIGS. 5A, 5B, and 5C are top, side, and end views of a quarter wave insert element.
Figure 5B:
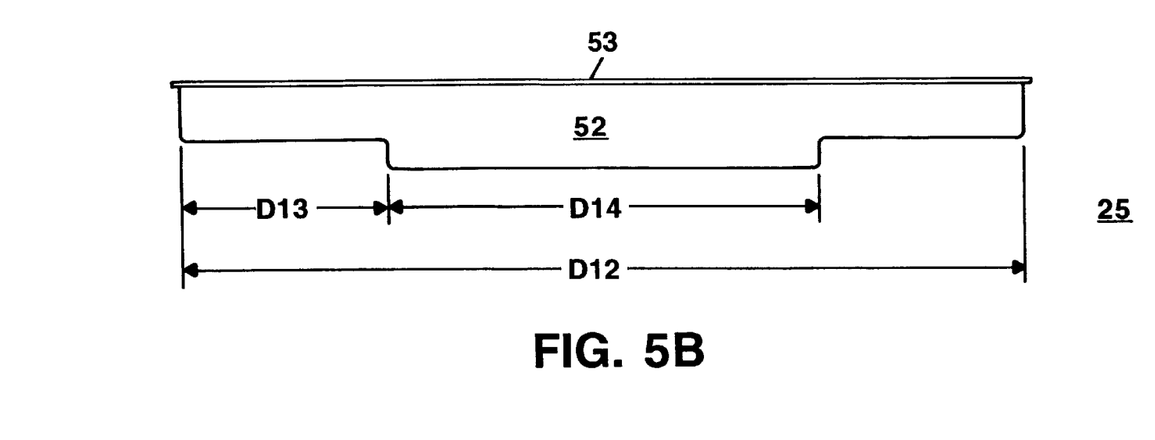
Figure 5C:
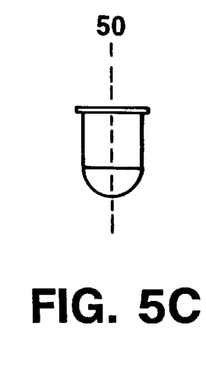

FIGS. 5A, 5B and 5C are top, plan and end views of the asymmetrical insert element 25. The insert 25 has a shape which is symmetrical about a plane 50 running through its center. For operation at the aforementioned 915 MHZ, the preferred insert has an overall length D12 of 23.56 in, end spacing D13 of 5.753 in, and middle section length D14 of 12.054 in. The insert 25 consists of a main section 52 and a power mounting flange 53 for permitting it to be attached to the cylindrical section 24.

The raised "bump" section within the center of the asymmetrical insert 25 is used to encourage self-matching of the element to the incoming energy. By presenting this section in the center of the insert a more transmissive transmission mode is enabled which more accurately matches the impedance of the incoming energy, thereby decreasing the reflectance properties of the insert 25.

Figure 6A:
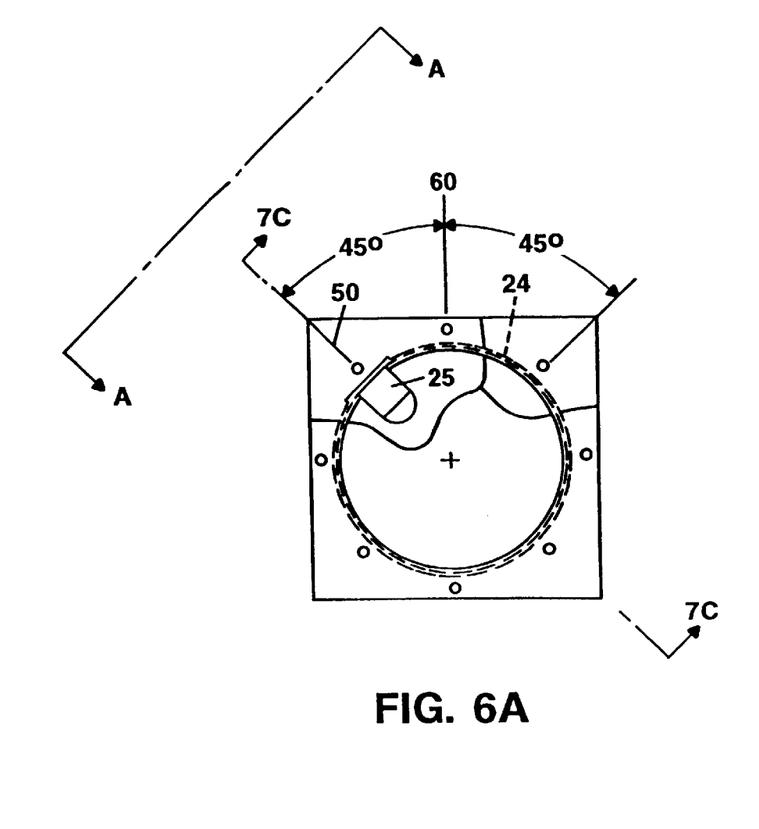
FIGS. 6A and 6B are a cross-sectional and detailed view of the quarter wave insert as placed within the circular waveguide section.
Figure 6B:
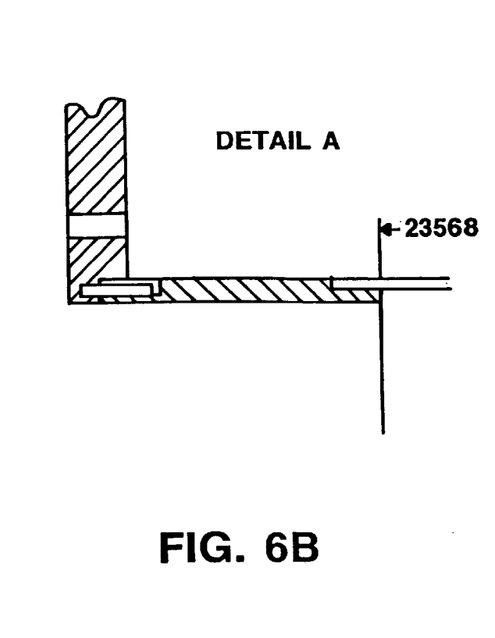

FIG. 6A is an end view of the quarter wave cylindrical section 24 showing the placement of the insert 25 more particularly. The insert 25 is placed within the interior of the cylindrical section 24 such that electromagnetic symmetry is present about a central plane 50 of the insert only. This causes energy exiting from the rectangular waveguide 14 to depart from its linear polarization. In particular, the linearly polarized input microwave energy is presented to the asymmetrical insert 25 which is mounted at a 45 degree angle with respect to the symmetry plane 50. The result is that energy is presented to the circular section 24 which is in a form equivalent to half parallel to and half perpendicular to the symmetry plane 50.

Figure 7A:
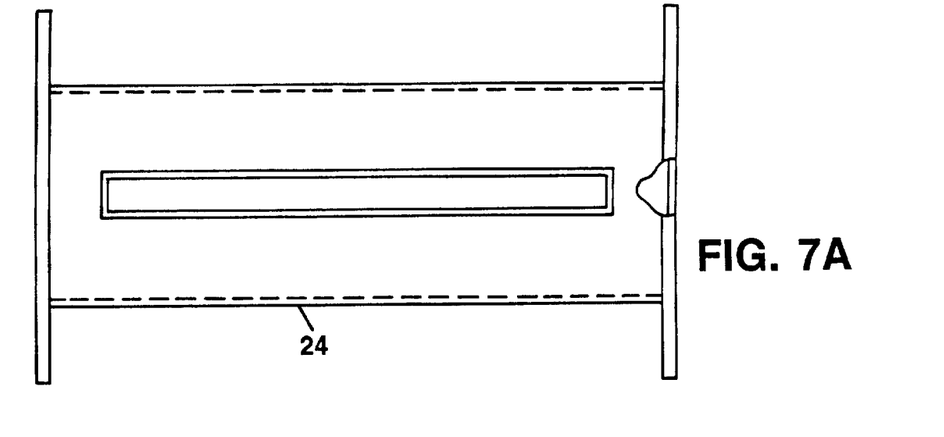
FIGS. 7A, 7B, and 7C are cross-sectional views of the quarter wave insert section taken at various angles.
Figure 7B:
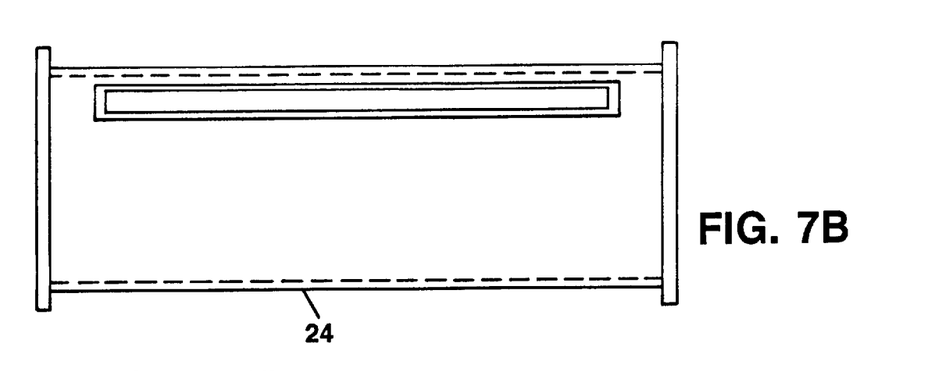
Figure 7C:
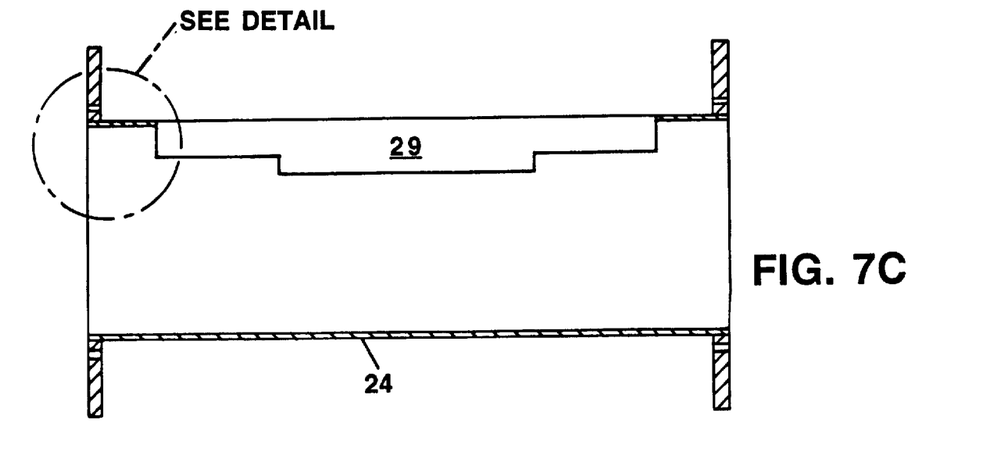

FIGS. 7A, 7B and 7C are more detailed cross sectional views of the cylindrical section 24 taken at various angles, better illustrating the positioning of the insert 25. For example, the view of FIG. 7A is taken through the lines 7A showing FIG. 6A.

Figure 8A:
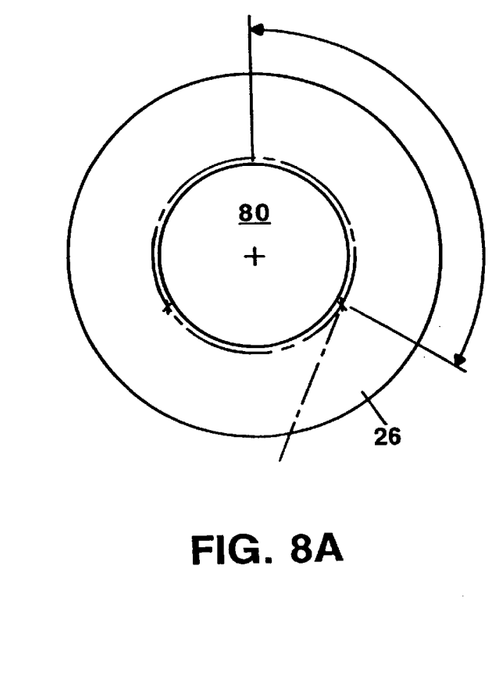
FIGS. 8A, 8B, and 8C are cross-section, front and back views of an optional launcher for use with the feed.
Figure 8B:
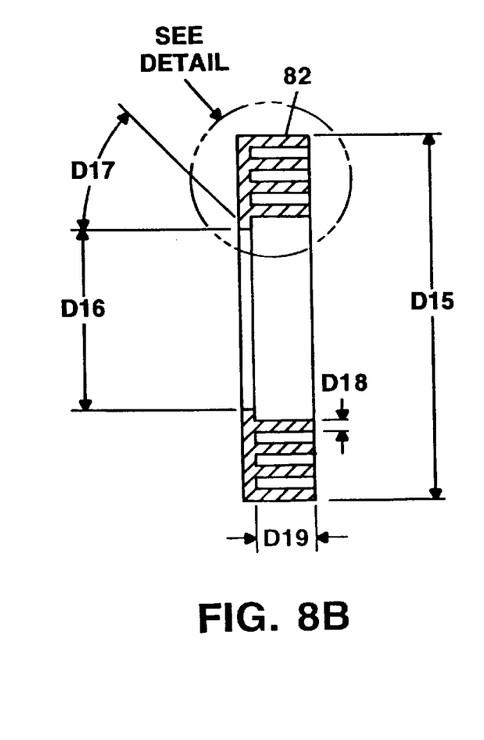
Figure 8C:
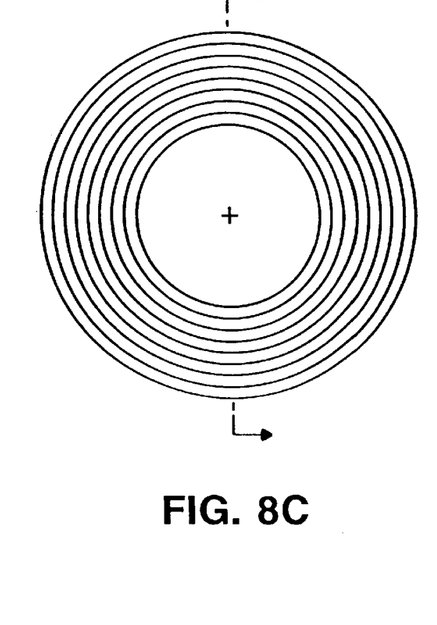

FIGS. 8A, 8B and 8C show in greater detail an optional extension 26 which may be placed at the end of the cylindrical section 24. The extension 26 is of a generally circular shape having a circular opening 80 formed therein, to which the circular feed is attached. Fins 82 encourage the spread and matching of energy exiting from the circular waveguide provided by the cylindrical section 24 to the interior of the enclosure 15. The extension 26 may have an overall diameter D15 of 8.0 in, a diameter D16 of 4.5 in for the opening 80, fin thickness D18 of 0.250 in and fin depth D19 of 1.25 in, for operation at 2450 MHz.

FIG. 8A is a plan view of the extension 26 where it meets with the end of the cylindrical section 24. FIG. 8B is a cross-sectional view of the extension 26 and FIG. 8C is an end view 26, as seen from the interior of the enclosure 15.

Figure 9A:
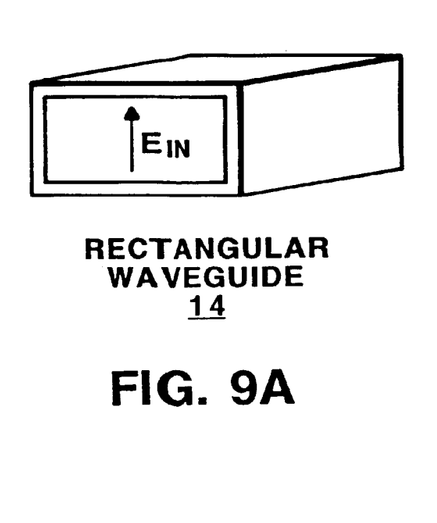
FIGS. 9A, 9B and 9C depict schematic diagrams of the feed.
Figure 9B:
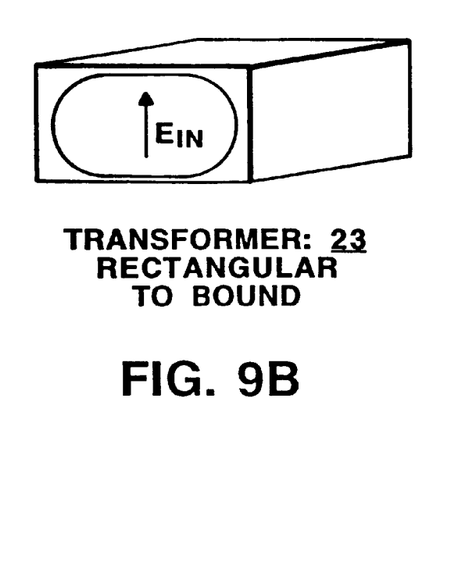
Figure 9C:
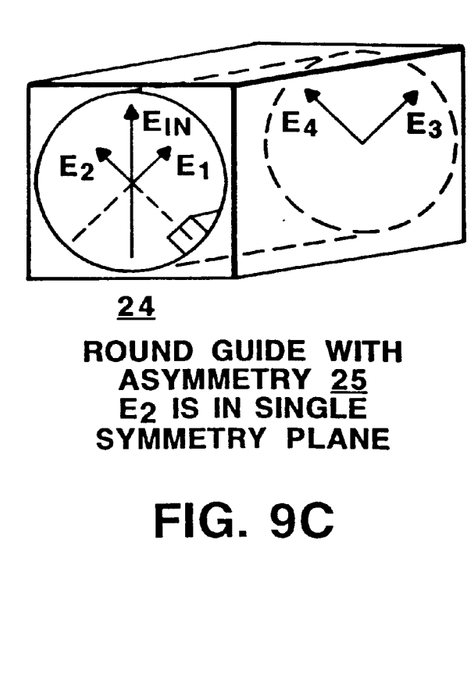

FIGS. 9A, 9B and 9C can now be referred to as a schematic diagram for understanding the operation of the circularly polarized feed 20 more particularly. In particular, the rectangular waveguide 14 presents microwave energy in the $TE_{11}$ mode with a linear polarization in a direction $E_1$ which is parallel to the minor dimension of the rectangular waveguide 14. Energy coupled through the transformer 23 maintains this orientation throughout the transformer 23.

At the output end of the transformer 23, corresponding to the input end of the cylindrical section 24, the input field $E_{IN}$ can be considered as the vector sum of two mutually perpendicular vector $E_1$ and $E_2$, as shown in the diagram. A first energy polarization vector $E_1$ is presented in orientation which is perpendicular to the single symmetry 50 plane of the asymmetrical element 25. A second polarization energy vector, $E_2$, is also present which is in the same plane as the single symmetry plane of the asymmetrical insert 25.

At the output end of the circular guide 24, the polarization vectors $E_3$ and $E_4$ can be determined through the following mathematical derivation. Assuming, for example, that the phase shift is $\Phi_1$ for polarization $E_1$, the phase shift for polarization $E_2$ is therefore $(\Phi+\pi/2)$, that is, the quarter wave insert section 25 present a polarization $E_2$ which is 90 degrees out of phase with respect to the polarization of $E_1$. As such, expressions for $E_3$ and $E_4$ can be derived as:

$$E_3 = E_1 e^{-j\Phi_1}$$

$$E_4 = E_2 e^{-j(\Phi_1 \pi/2)} = -jE_2 e^{-j\Phi_1}$$

For input energy at 45 degrees to the asymmetry, $|E_1|=|E_2|$, and neglecting the common phase shifts $\Phi_1$, gives $$E_3 = E_1$$

$$E_4 = -jE_1$$

Thus, the sinusoidal variations of $E_3$ and $E_4$ are equal and are $\pi/2$ out of phase, giving a resultant circular polarization into the enclosure 15 which is constant in amplitude but whose polarization continuously rotates.

It can now be understood that by presenting a single mode linearly polarized input such via a rectangular waveguide, and then presenting it to a structure having symmetry about a plane only, the input energy is split into two components, one parallel to and one perpendicular to the plane of symmetry. By introducing a delay to these two components so that they are 90 degrees out of phase with one another, they add together to provide a resulting output microwave signal which is circularly polarized such that it maintains a constant amplitude, but has an angle of polarization that continuously rotates.

It can also be understood how circularly polarized, continuously varying microwaves can be introduced using an asymmetrical element, without the use of moving parts. At the same time, the ability to handle a greatly increased power over other techniques that use coaxial rotating parts is achieved. This is accomplished using the asymmetrical insert element 25 which provides a load to the electromagnetic energy which converts linearly polarized input energy with a single mode to circularly polarized output energy having a constantly rotating phase. As a result, multiple microwave transmission modes are created within the enclosure 15.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. For example, the asymmetric insert 25 may be disposed at a 45 degree angle to the walls of a square waveguide section 24 to accomplish the same result. In addition, the circularly polarized feed is suitable for any type of microwave oven cavity, including batch and continuous belt processing systems. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A feed for a microwave oven, the feed coupling microwave energy originating from an input waveguide into an oven enclosure, the feed comprising:
    (a) a transformer for coupling to microwave energy provided by the input waveguide;
    (b) an exit waveguide, for coupling energy received from the transformer directly into the enclosure using a full cross-section of the exit waveguide; and
    (c) an asymmetrical insert element fixed within an interior portion of the exit waveguide, the asymmetrical insert element having a shape such that it presents symmetry to microwave energy only about a single symmetry plane.

2. An apparatus as in claim 1 wherein energy presented by the transformer to the asymmetrical element is polarized at a 45 degree angle with respect to the single symmetry plane.

3. An apparatus as in claim 2 wherein the energy produced by the exit waveguide is circularly polarized.

4. An apparatus as in claim 1 wherein the exit waveguide is a circular waveguide.

5. An apparatus as in claim 1 wherein the exit waveguide is a square waveguide.

6. An apparatus as in claim 1 wherein the input waveguide operates in a $TE_{11}$ mode.

7. An apparatus as in claim 1 wherein the asymmetrical insert element is shaped to provide an impedance match between the input rectangular waveguide and the exit waveguide.

8. An apparatus as in claim 1 additionally comprising:
    an extension for encouraging energy to exit the exit waveguide thereby launching the energy into the enclosure.

9. An apparatus as in claim 1 where the polarizing feed is attached to a microwave oven containing hot air or gas, for both hot air/gas and microwave processing.

10. An apparatus as in claim 1 where the polarizing feed is attached to a kiln to provide microwave, infra red and hot air/gas processing.

11. A method for coupling microwave energy to multiple modes of a cavity comprising the steps of:
    providing energy at an input polarization to a polarization waveguide section which contains an asymmetrical insert element, the asymmetrical insert element having a shape such that it presents symmetry to microwave energy only about a single plane; and
    presenting energy exiting from the polarization waveguide section directly into the cavity.

12. A method as in claim 11 wherein energy presented to the asymmetrical element is polarized at a 45 degree angle with respect to the symmetry plane.

13. A method as in claim 11 wherein the exit energy is circularly polarized.

14. A method as in claim 11 wherein the exit energy is produced by a circular waveguide.

15. A method as in claim 11 wherein the exit energy is produced by a square waveguide.

16. A method as in claim 11 wherein the input waveguide operates in a $TE_{11}$ mode.

17. A method as in claim 11 where in the asymmetrical element is shaped to provide an impedance match between the input rectangular waveguide and the exit waveguide.

18. A method as in claim 11 additionally comprising the step of:
coupling an extension for encouraging energy to exit the exit waveguide thereby launching the energy into the enclosure.

19. A method as in claim 11 where the polarizing feed is attached to a microwave oven containing hot air or gas, for both hot air/gas and microwave processing.

20. A method as in claim 11 where the polarizing feed is attached to a kiln to provide microwave, infra red and hot air/gas processing.

* * * * *